United States Patent
Bezemer et al.

(10) Patent No.: US 12,256,755 B2
(45) Date of Patent: Mar. 25, 2025

(54) PROCESS FOR PREPARING A FAT SLURRY AND FOR PREPARING A SPREAD WITH SAID SLURRY

(71) Applicant: Flora Food Global Principal B.V., Amsterdam (NL)

(72) Inventors: Albert Jan Bezemer, Spijkenisse (NL); Johannes Jozef Marie Janssen, Rotterdam (NL); Marcel Stevens, Brasschaat (BE)

(73) Assignee: FLORA FOOD GLOBAL PRINCIPAL B.V., Amsterdam (NL)

( * ) Notice: Subject to any disclaimer, the term of this patent is extended or adjusted under 35 U.S.C. 154(b) by 874 days.

(21) Appl. No.: 15/517,418

(22) PCT Filed: Oct. 9, 2015

(86) PCT No.: PCT/EP2015/073335
§ 371 (c)(1),
(2) Date: Apr. 6, 2017

(87) PCT Pub. No.: WO2016/058913
PCT Pub. Date: Apr. 21, 2016

(65) Prior Publication Data
US 2017/0251690 A1    Sep. 7, 2017

(30) Foreign Application Priority Data
Oct. 13, 2014 (EP) .................................... 14188657

(51) Int. Cl.
| | | |
|---|---|---|
| *A23D 9/05* | (2006.01) | |
| *A21D 2/16* | (2006.01) | |
| *A23D 7/00* | (2006.01) | |
| *A23D 7/005* | (2006.01) | |
| *A23D 7/04* | (2006.01) | |
| *A23D 9/00* | (2006.01) | |
| *A23D 9/007* | (2006.01) | |
| *A23D 9/04* | (2006.01) | |
| *A23L 9/20* | (2016.01) | |
| *A23L 33/115* | (2016.01) | |
| *C11B 15/00* | (2006.01) | |
| *A23L 27/60* | (2016.01) | |

(52) U.S. Cl.
CPC ............... *A23D 9/05* (2013.01); *A21D 2/16* (2013.01); *A23D 7/001* (2013.01); *A23D 7/0056* (2013.01); *A23D 7/04* (2013.01); *A23D 9/00* (2013.01); *A23D 9/007* (2013.01); *A23D 9/04* (2013.01); *A23L 9/24* (2016.08); *A23L 33/115* (2016.08); *C11B 15/00* (2013.01); *A23L 27/60* (2016.08); *A23V 2002/00* (2013.01)

(58) Field of Classification Search
CPC .. A23D 9/05; A23D 9/007; A23L 9/24; A23L 33/115; A21D 2/16; C11B 15/00
See application file for complete search history.

(56) References Cited

U.S. PATENT DOCUMENTS

| | | |
|---|---|---|
| 3,121,015 A | 2/1964 | Avera |
| 3,973,046 A | 8/1976 | Mol |
| 4,952,224 A | 8/1990 | Lilakos |
| 2007/0264406 A1* | 11/2007 | Beutler ............... A23C 9/1544 426/564 |
| 2011/0244111 A1 | 10/2011 | Den Adel et al. |
| 2011/0287160 A1* | 11/2011 | Dobenesque .......... A23D 7/001 426/604 |
| 2011/0293811 A1* | 12/2011 | Linqiu ................. A23C 9/1526 426/564 |
| 2011/0293812 A1 | 12/2011 | Dobenesque et al. |
| 2011/0311706 A1 | 12/2011 | van den Berg et al. |
| 2013/0192278 A1 | 8/2013 | Arends et al. |

FOREIGN PATENT DOCUMENTS

| | | |
|---|---|---|
| EP | 1395126 | 4/2005 |
| EP | 1651338 | 5/2006 |
| EP | 1865786 | 11/2011 |
| GB | 1164462 | 9/1969 |
| WO | WO2006087090 | 8/2006 |
| WO | WO2011134627 | 11/2011 |
| WO | WO2014005797 | 1/2014 |

OTHER PUBLICATIONS

IPRP in PCTEP2015073335, Aug. 25, 2016.
Margarines and Shortenings, Ullmanns Encyclopedia of Industrial Chemistry, 1990, PP156-158, vol. A16.
P. Munuklu et al., Particle formation of edible fats using the supercritical melt micronization process (ScMM), The Journal of Supercritical Fluids, 2007, pp. 181-190, vol. 43, Elsevier.
Search Report in EP14188657, Nov. 14, 2014.
Search Report in PCTEP2015073335, Dec. 10, 2015.
Written Opinion in EP14188657, Nov. 14, 2014.
Written Opinion in PCTEP2015073335, Dec. 10, 2015.

\* cited by examiner

*Primary Examiner* — Katherine D Leblanc
(74) *Attorney, Agent, or Firm* — ARENTFOX SCHIFF LLP

(57) ABSTRACT

Process for preparing an edible fat slurry comprising 60-98% by weight (on the total slurry of oil and fat powder) of an edible oil phase and 2-40% by weight (on the total slurry of oil and fat powder) of fat powder, wherein the fat powder is sprayed directly a mixing vessel to be combined with oil.

17 Claims, No Drawings

PROCESS FOR PREPARING A FAT SLURRY AND FOR PREPARING A SPREAD WITH SAID SLURRY

FIELD OF THE INVENTION

The present invention relates to a process for preparing a slurry of edible oil and fat powder, and to a process of preparing an edible fat-continuous spread out of such.

BACKGROUND OF THE INVENTION

Fat continuous food products are well known in the art and include for example shortenings comprising a fat phase and water in oil spreads like margarine comprising a fat phase and an aqueous phase.

The fat phase of margarine and similar edible fat continuous spreads is often a mixture of liquid oil (i.e. fat that is liquid at ambient temperature) and fat which is solid at ambient temperatures. The solid fat, also called structuring fat or hardstock fat, serves to structure the fat phase (being the case in for example a shortening as well as in a water in oil emulsion) and helps to stabilize the aqueous phase, if present, by forming a fat crystal network. For a margarine or spread, ideally the structuring fat has such properties that it melts or dissolves at mouth temperature. Otherwise the product may have a heavy and/or waxy mouthfeel.

Important aspects of a fat continuous spread like for example margarine and low fat spread, the low fat spread usually comprising up to 45 wt % fat on total composition, are for example hardness, spreadability and ability to withstand temperature cycling. Temperature cycling means that the product is subjected to low and high temperatures (e.g. when the consumer takes the product out of the refrigerator and leaves it for some time at the table prior to use). This may have a negative influence on the structure of the spread (like for example destabilization of the emulsion or oil-exudation).

Generally edible fat continuous food products like shortenings and margarines and similar edible fat continuous spreads are prepared according to prior art processes that encompass the following steps:
1. Mixing of the liquid oil, the structuring fat and if present the aqueous phase at a temperature at which the structuring fat is definitely liquid;
2. cooling of the mixture under high shear to induce crystallization of the structuring fat to create an emulsion;
3. formation of a fat crystal network to stabilize the resulting emulsion and give the product some degree of firmness;
4. modification of the crystal network to produce the desired firmness, confer plasticity and reduce the water droplet size.

These steps are usually conducted in a process that involves apparatus that allow heating, cooling and mechanical working of the ingredients, such as the churn process or the votator process. The churn process and the votator process are described in the Ullmans Encyclopedia, Fifth Edition, Volume A 16, pages 156-158.

A disadvantage of these processes is that the complete composition (including the liquid oil, structuring fat and if present the aqueous phase) is subjected to a heating step and a cooling step. This requires a lot of energy. For a spread comprising for example 6 wt % structuring fat the whole composition (100 wt %) has to be heated and cooled.

Another disadvantage of the known processes is that the choice of fats that can practically be used as structuring agent is rather limited. If the melting point of the structuring agent is too high the melting properties in the mouth are unsatisfactory. If on the other hand, the melting point is too low, the emulsion stability will be negatively affected. Moreover the amount of saturated fatty acids (SAFA) in the structuring agent is usually relatively high. Also trans fatty acid may be present. Some experts have called for reductions in these fatty acids to improve cardiovascular health.

Some consumers prefer spreads that have a low energy density (for example products that are low in total fat) and/or are low in SAFA but still have a good nutritional profile (by providing for example essential fatty acids like omega-3 and omega-6).

A further disadvantage of the known processes is that the product may deteriorate due to the changes in temperature caused by the heating and cooling step.

Alternative processes have been described wherein the structuring fat is added as fat powder (i.e. crystallized fat) thereby eliminating the need to heat the whole composition to above the melting temperature of the structuring fat.

EP 1865786 A discloses a process for the preparation of a spreadable edible dispersion wherein a mixture of oil and solid structuring agent particles is subjected to stirring and an aqueous phase is gradually added to the mixture until a dispersion is obtained. The solid structuring agent particles have a microporous structure of submicron size particles and can be prepared using a micronisation process. The solid structuring agent particles (i.e. can be seen as fat powder) in such process need to be mixed with oil. Such can be achieved in various ways. Mixing powders of low bulk density (i.e. very fluffy powders) with a liquid, e.g. edible oil, can pose some difficulties.

EP 1395126 B1 discloses a process for making granulated milk substitutes, in which a basic component (dried whey and starches are exemplified as basic component, milk powder being preferred) is mixed with fat under reduced pressure and at an elevated temperature.

It is not only the mixing of a powder with low bulk density such as fat powder with a low bulk density (e.g. 20-400 g/l) with a liquid such as edible oil which can be difficult, but also the handling of the powder as such, in particular transporting such powder to the vessel in which it is mixed. The fat powder referred to herein can be made by any suitable process for making fat powder. Suitable methods to prepare the fat powder include for example cryo-crystallization, in which atomized liquid droplets come in contact with liquid nitrogen causing the droplets to instantaneously solidify, and Super Critical Melt Micronisation (ScMM), also known as particles from gas saturated solutions (PGSS). ScMM is a commonly known method and is for example described in J. of Supercritical Fluids 43 (2007) 181-190 and EP1651338. For some applications fat powders prepared by this super critical melt micronisation (micronized fat powders) are preferred.

SUMMARY OF THE INVENTION

Hence, it is an object of the present invention to provide a process for making a slurry of edible oil and fat powder, which manufacturing is in a convenient way, and which deals with the difficulties of both handling fat powder as well as mixing fat powder and liquid edible oil to a slurry.

It has now been found that the above objectives can be met, at least partially, by a process for preparing a fat slurry comprising 60-98% by weight (on the total slurry of oil and fat powder) of an edible oil phase and 2-40% by weight (on the total slurry of oil and fat powder) of fat powder, wherein the fat powder is a powder of a structuring fat, said process comprising the steps of:
- a) providing the fat powder in a mixing vessel;
- b) providing the oil phase in an oil vessel;
- c) reducing the pressure in the mixing vessel comprising the fat powder to a pressure of less than 0.3 bar;
- d) adding the required amount of oil phase from the oil vessel to the mixing vessel to provide a combined oil phase and fat powder of the above composition;
- e) mixing the combined oil phase and fat powder to a fat slurry, wherein the fat powder in step a) is provided to the mixing vessel by feeding the structuring fat in melted form to a nozzle, which nozzle is connected to the mixing vessel, and wherein the structuring fat in melted form is cooled to solidify so as to yield the fat powder.

A fat slurry of a fat powder and an edible liquid oil so-prepared can conveniently be used in a process for making an edible oil-continuous emulsions such as spreads and margarines. Hence, the invention further relates to a process for manufacturing edible oil-continuous emulsions containing 15-80% (by weight on the total emulsion) of a fat phase and 20-85% (by weight on the total emulsion) of an aqueous phase, which process comprises the steps of
providing the aqueous phase at a temperature below 35° C.,
providing a fat slurry of oil and fat powder,
mixing said aqueous phase and said fat slurry to obtain an oil-continuous emulsion,
wherein said fat slurry is obtained by the process as set out above and in further detail below.

DETAILED DESCRIPTION OF THE INVENTION

"Mixing vessel" is herein to be understood as a vessel equipped with at least one stirring device, which vessel can hold edible oil and fat powder, and which vessel is connected to at least one nozzle through which the fat powder can be entered into the mixing vessel. The nozzle can be connected directly onto the mixing vessel or indirectly, e.g. through a spray tube. The mixing vessel is suitable to be depressurized to pressures below 0.1 bar. The stirring device can be an anchor stirrer, a high-speed mixer, a pump which recirculates the content of the mixing vessel from an exit of the mixing vessel through an inline dynamic mixer to an inlet of the mixing vessel, or any other device which brings about motion to the content of the mixing vessel, or any combination of thereof.

"Oil vessel" is herein to be understood as a storage vessel for storing the edible liquid oil phase which is used to make the slurry. It can contain an oil or a blend of oils, and it can be used to blend non-oil components into the oil phase, such as colourants, emulsifiers, and the like.

"Nozzle" is herein to be understood as equipment that converge the flow (of in this case melted structuring fat) to one or more exits. "Nozzle" herein encompasses both a single nozzle as well as multiple nozzles.

"Fat slurry" herein means liquid oil containing dispersed therein small particles of crystallized fat.

"Oil phase" is herein to be understood to comprise both a single edible oil as well as mixtures of edible oils. The oil is preferably a vegetable oil. Examples of such oils are sunflower oil, canola oil, corn oil, bean oil or mixtures thereof. Preferably, at least 80% of the oil are triglycerides. The oil phase may contain, next to the oil, other components, e.g. in an amount up to 20%, of other components, such as colourants, vitamins, and/or emulsifiers.

"Structuring fat" is herein to be understood to comprise both a single fat as well as mixtures of fats. The structuring fat is an edible fat solid at 20° C. The structuring fat may be a single fat or a blend of fats. It is preferably a triglyceride fat. It may be a natural fat, such as palm kernel fat or coconut fat, or it may be a modified fat, such as a fat or fat blend subjected to one or more of hydrogenation, interesterification, enzymatic interesterification, fractionation (wet or dry), or blending. Structuring fats (also known as hardstock) are fats known for being able to structure an edible spreadable oil-continuous emulsions. Preferably, the structuring fat has a solid fat content N10 from 50 to 100, N20 from 26 to 95 and N35 from 5 to 60.

"Ambient conditions" are herein to be understood as to be 20° C. and atmospheric pressure.

When manufacturing a fat powder such as by the micronisation technique, the fat powder is usually collected in a storage vessel. When such fat powder is later needed for making a slurry by mixing with edible oil, the fat powder is then transported to a mixing vessel. In the present invention, the fat powder is made into the mixing vessel (the vessel in which later the fat powder and the edible liquid oil are mixed), thus obviating the need for transporting the fat powder. This is possible, as the fat powder can be made by expelling a melted fat through a nozzle, and the nozzle can be positioned onto the mixing vessel (directly, or indirectly, e.g. connected by a spray tube), thereby producing the fat powder where it is being mixed to a slurry with liquid oil.

Thus, an advantage of the process of the present invention is that the fat powder needs to be transported as little as possible, but rather that the oil and the slurry are transported. It was found that the process of the present invention is especially advantageous when having as little as possible process steps between manufacturing the fat powder and mixing with the oil to produce the slurry. Following this, it is preferred that the fat powder is provided in the mixing vessel by spraying the melted structuring fat through the nozzle into the mixing vessel.

In order to effect the process according to this invention, the nozzle (single or plural) can be mounted directly on the mixing vessel (usually on the upper section, preferably on the top of the mixing vessel, or it can be connected to the mixing vessel by means of a spray tube, which spray tube is connected to the mixing vessel. A spray tube is a comparatively wide tube which can guide the produced spray from the nozzle into a desired direction, usually downwards for a nozzle mounted on top of a mixing vessel.

For producing fat powder as can be used in the present process, and which can also be used in the process of making a spread using a slurry of such fat powder, it is required that the fat powder is made of a structuring fat which is solid at 20° C. More preferably, the structuring fat has a solid fat content N10 from 50 to 100, N20 from 26 to 95 and N35 from 5 to 60.

In the process according to the invention, in the part of said process wherein the fat powder in step a) is provided to the mixing vessel by feeding said structuring fat in melted form to a nozzle, the feeding is preferably carried out under pressure. Such pressure can e.g. be exerted by a pump, a pressurised medium such as a gas, a combination thereof, or otherwise. The fat powder in the present invention can be made by any suitable process for making fat powder, as long as it is fed to the mixing vessel from a nozzle. Suitable methods to prepare the fat powder include for example cryo-crystallization, in which atomized liquid droplets come in contact with liquid nitrogen causing the droplets to instantaneously solidify, and Super Critical Melt Micronisation (ScMM), also known as particles from gas saturated solutions (PGSS). ScMM is a commonly known method and is for example described in J. of Supercritical Fluids 43 (2007) 181-190 and EP1651338. For some applications fat powders prepared by this super critical melt micronisation (micronized fat powders) are preferred. PGSS uses a component gaseous at ambient conditions dissolved in fat.

Examples of such "component gaseous at ambient conditions" are $CO_2$, CO, $O_2$, $N_2$, air, $H_2$, noble gasses, and mixtures thereof. A preferred gaseous component in this connection is carbon dioxide ($CO_2$), as it combines high dissolvability in melted fat (which is an advantage) with properties which enable easy handling, e.g. w.r.t. toxicity, flammability, and pressure and temperature of its critical point. Hence, it is preferred in the present invention that said component gaseous at ambient conditions is a mixture comprising at least 50%, preferably at least 80%, more preferably at least 90%, by weight of the total amount of said component gaseous at ambient conditions is $CO_2$ (carbon dioxide). Preferably, all of the component gaseous at ambient conditions herein is $CO_2$.

In order to dissolve sufficient component gaseous at ambient conditions ("gas"), e.g. $CO_2$, into the structuring fat to be sprayed the structuring fat is preferably melted, and then mixed with said gas under pressure.

In the process according to the present invention, the melted structuring fat with the dissolved component gaseous at ambient conditions are being fed to the nozzle at a pressure of between 5 and 400 bars and a temperature of between 35 and 120° C. This can be achieved e.g. directly by pumping and/or by pressurising it by a pressurised gas.

The nozzle can be selected from a range of geometries that converge the flow to one or more narrow exits, in order to produce a fine spray. A simple example would be a cone-capillary nozzle, i.e. a conical volume that fits to a feed tube at its entrance and ends downstream in a narrow cylindrical exit channel. Optionally a swirl core may be present inside the conical volume. Alternatively, the exit can comprise multiple exit channels, or have the shape of a narrow slit. Optionally, several of such nozzles can be used in parallel.

After the fat powder has been prepared by spraying for a sufficient time the melted structuring fat (i.e. after stopping the spraying, as this is a batch-operated process), and before the fat powder is mixed in the mixing vessel with the oil, the pressure of the mixing vessel in step c), which now contains the fat powder, is preferably reduced to below 0.2 bar, more preferably to below 0.15 bar and even more preferably to below 0.1 bar.

During/after step c) we then have a mixing vessel containing a desired portion of fat powder, which mixed vessel is at reduced pressure or of which the pressure is being reduced. Thereafter, in step d), the required amount of oil phase is added to this de-pressurised mixing vessel, preferably under mixing.

At some point the pressure in the mixing vessel is brought up to atmospheric pressure, preferably, such is during or after step e). It may be convenient to carry out several steps at least partially overlapping (i.e. to some extent simultaneously). In this connection, it may be preferred for process efficiency if at least part of steps d) (adding oil phase) and e) (mixing) are carried out simultaneously. Likewise, it may also be convenient to carry out reducing the pressure (step c) and adding the oil phase (step d) at least partially overlapping. In this way the oil may be sucked into the mixing vessel due to low pressure in the mixing vessel.

As mentioned, the mixing vessel should be equipped with at least one device which brings about mixing (of fat powder and oil phase). This may be any suitable mixing device for such materials. Preferred mixing devices in this connection are one or more of a recirculation means, a dynamic mixer, a stirrer in the mixing vessel. It is preferred in this process to mix using a recirculation means which comprises an in-line mixer, more preferably a dynamic in-line mixer, as such may avoid areas with lots of fat powder next to areas of oil phase which by-pass the fat powder (short-circuiting).

It is preferred that the temperature of the fat powder, and any formulation which contains such, e.g. the fat slurry of oil phase and fat powder is kept below a certain limit, so as to avoid the fat powder, made with such effort, from melting, thereby losing part of its structuring properties. Hence, the temperature in the vessel is preferably kept below the melting point of the fat powder. More specifically, as the fat powder is advantageously used in spreads for edible consumption, it is preferred that the temperature of the fat powder, oil phase, and mixture thereof is kept at a temperature of below 35° C.

In principle the fat powder can be mixed with the oil phase at any ratio physically possible. However, if it is desired to manufacture e.g. an edible spreadable dispersion of such slurry (by mixing with a water phase) it is preferred that the amount of the fat powder on the total fat slurry is from 2-40%, preferably from 4 to 20%, more preferably from 6 to 15%, by weight, based on the total fat slurry.

The process according to the present invention is in particular suitable for mixing a fat powder with a very low bulk density with liquid oil, as these are both most difficult to handle and provide the biggest challenges in mixing with a liquid. Hence, it is preferred in the present invention that the fat powder has a bulk density of from 20 to 400 g/l, more preferably from 40 to 300 g/l.

The fat powder can be made by any suitable process for making fat powder. Suitable methods to prepare the fat powder include for example cryo-crystallization, in which atomized liquid droplets come in contact with liquid nitrogen causing the droplets to instantaneously solidify, and Super Critical Melt Micronisation (ScMM), also known as particles from gas saturated solutions (PGSS). ScMM is a commonly known method and is for example described in J. of Supercritical Fluids 43 (2007) 181-190 and EP1651338. For some applications fat powders prepared by this super critical melt micronisation (micronized fat powders) are preferred.

In a general sense, when wishing to use the slurry according to the invention for making spreadable edible oil continuous emulsions, it is preferred that the fat powder is made by a process of dissolving a gas pressurised to liquid or supercritical conditions, preferably $CO_2$, in melted fat, followed by spraying the gas-containing melted fat through the nozzle into the mixing vessel.

Apart from spraying the melted structuring fat preferably with a gas such as $CO_2$ dissolved in such fat (preferably at the saturation point, or up to 20% below), next to these compounds, an additional amount of pressurised gas not being dissolved in the melted structuring fat may be co-sprayed, either through the same nozzle or through another nozzle. Such may bring about additional cooling or transport effects, which can be advantageous. This can be the same gaseous compound, but can also be a different compound, such as $N_2$ or air (e.g. if the dissolved gas is $CO_2$).

EXAMPLES

Micronized fat powder was made according to the general method described in EP1651338 B1 and made in this case by directly spraying in a mixing vessel capable of achieving at least partial vacuum, via a nozzle connected to said mixing vessel. The melted structuring fat had 47 wt. % of dissolved $CO_2$ and was fed to the nozzle at a pressure of 250 bar. The fat powder made was an interesterified mixture of 65% dry fractionated palm oil stearin with an Iodine Value of 14 and 35% palm kernel oil. The fat powder in the mixing vessel was subjected to a pressure of 0.1 bar to allow efficient removal of remaining gas in the fat powder. The mixing vessel was equipped with a high shear mixer and a loop (running from the bottom to the top of the vessel), fitted with a recirculation pump and dynamic mixer. The main body-space of the vacuum vessel was further fitted with an agitator.

In a separate stainless steel vessel liquid vegetable oil was provided with added lecithin (0.4 wt % soybean lecithin, based on total fat; tradename Bolec ZT). The weight ratio of micronized fat powder in the mixing vessel and the amount of liquid vegetable oil in the other vessel was about 1:10 (fat powder:liquid vegetable oil). From the vessel with the liquid oil, a small amount of liquid oil (about 1.5 wt. % based on the total amount of liquid oil) was first added to the mixing vessel containing the fat powder (DU BG-type, Supplier: Zoatec) to the bottom part of the of the recirculation loop to prevent blockage.

The re-circulation pump was started, the dynamic mixer operated at 3000 rpm, the high shear mixer at 960 rpm and the agitator at 6 rpm. The remaining (98.5 wt. %) oil was added to the mixing vessel, while pressure was maintained in the mixing vessel at 0.2 bar. The oil blend and the fat powder were mixed until a homogenous slurry was obtained with well-dispersed fat powder, after which the vacuum was released to allow pressure to equalize to atmospheric levels.

During the process to provide the slurry of fat powder and oil blend, as described above, the fat powder comprising hardstock fat (once formed) was not subjected to temperatures at which it would substantially melt. Cooling was applied as needed.

The finished slurry can be more efficiently transported (as compared to the fat powder as such) since having far greater high bulk density and also since having none of the issues involved with handling of powders as such (e.g. dustiness). The slurry of oil blend and fat powder was successfully used in the preparation of water-in-oil emulsions.

The invention claimed is:

1. A process for preparing an edible fat slurry comprising 60-98% by weight (of the total slurry of oil and fat powder) of an edible oil phase and 2-40% by weight (of the total slurry of oil and fat powder) of a fat powder, wherein the fat powder is a powder of a structuring fat and has a bulk density of from 40 to 300 g/L, said process comprising the steps of:
   a) providing the fat powder in a mixing vessel;
   b) providing the oil phase in an oil vessel;
   c) reducing the pressure in the mixing vessel comprising the fat powder to a pressure of less than 0.3 bar, prior to the addition of the oil phase to the mixing vessel;
   d) after the pressure in the mixing vessel has been reduced to less than 0.3 bar, adding at least a portion of the oil phase from the oil vessel to the mixing vessel to provide a combined oil phase and fat powder of the above composition; and
   e) mixing the combined oil phase and fat powder to form a fat slurry;
   wherein the fat powder in step a) is provided to the mixing vessel by feeding the structuring fat in melted form to at least one nozzle, which is connected to the mixing vessel and configured to spray the melted structuring fat through the nozzle into the mixing vessel; and
   wherein the structuring fat being sprayed through the nozzle comprises, dissolved in the melted structuring fat, a component gaseous at ambient conditions, wherein said component gaseous at ambient conditions comprises at least 80% carbon dioxide ($CO_2$), by weight of the total amount of said component gaseous at ambient conditions, and is present in an amount at the saturation point for the melted structuring fat; and
   wherein the mixing vessel consists of the fat powder during step c).

2. The process of claim 1, wherein the structuring fat in melted form is cooled to solidify so as to yield the fat powder.

3. The process of claim 1, wherein the melted structuring fat with the dissolved component gaseous at ambient conditions are being fed to the nozzle at a pressure of between 5 and 400 bars and a temperature of between 35 and 120° C.

4. The process of claim 1, wherein the pressure in step (c) is reduced to below 0.1 bar.

5. The process of claim 1, wherein during step (e) the pressure is brought up to atmospheric pressure.

6. The process of claim 1, wherein at least part of steps d) and e) are carried out simultaneously.

7. The process of claim 1, wherein the oil phase and the fat powder are mixed by one or more of (a) recirculation means, (b) a dynamic mixer, and (c) a stirrer in the mixing vessel.

8. The process of claim 7, wherein recirculation means comprises an in-line mixer.

9. The process of claim 1, wherein the amount of fat powder in the total fat slurry is from 4 to 20% by weight, based on the total fat slurry.

10. The process of claim 1, wherein the fat powder is a micronised fat powder.

11. The process of claim 1, wherein the fat powder is made by a process of dissolving a gas pressurised to liquid or supercritical conditions, in melted fat, followed by spraying the gas-containing melted structuring fat through the nozzle into the mixing vessel.

12. A process for making an edible oil-continuous emulsion containing 15-80% (by weight of the total emulsion) of a fat phase and 20-85% (by weight of the total emulsion) of an aqueous phase, which process comprises the steps of:
   a) providing the aqueous phase at a temperature below 35° C.,
   b) providing a fat slurry of oil and fat powder,
   c) mixing said aqueous phase and said fat slurry to obtain an oil-continuous emulsion,
   wherein said fat slurry is obtained by the process comprising the steps of claim 1.

13. The process of claim 1, wherein the structuring fat has a solid fat content N10 from 50 to 100, N20 from 26 to 95 and N35 from 5 to 60.

14. The process of claim 1, wherein the fat powder in step a) is provided to the mixing vessel by feeding the structuring fat in melted form to a plurality of nozzles, wherein each nozzle is connected to the mixing vessel and configured to spray the melted structuring fat through the nozzle into the mixing vessel.

15. The process of claim 11, wherein the gas pressurised to liquid or supercritical conditions is $CO_2$.

16. The method of claim 1, wherein said component gaseous at ambient conditions is a mixture comprising at least 90% carbon dioxide ($CO_2$), by weight of the total amount of said component gaseous at ambient conditions.

17. The method of claim 1, wherein said component gaseous at ambient conditions is carbon dioxide ($CO_2$).

\* \* \* \* \*